United States Patent
Kim et al.

(10) Patent No.: US 7,484,876 B2
(45) Date of Patent: Feb. 3, 2009

(54) BACKLIGHT ASSEMBLY AND LIQUID CRYSTAL DISPLAY DEVICE USING THE SAME

(75) Inventors: Kyu-Seok Kim, Yongin-si (KR); Ik-Soo Lee, Suwon-si (KR); Jeong-Seok Oh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/601,104

(22) Filed: Nov. 17, 2006

(65) Prior Publication Data

US 2007/0064172 A1    Mar. 22, 2007

Related U.S. Application Data

(63) Continuation of application No. 10/452,319, filed on May 30, 2003, now Pat. No. 7,161,644.

(51) Int. Cl.
*F21V 7/04* (2006.01)

(52) U.S. Cl. .................. 362/616; 362/623; 362/561; 349/62

(58) Field of Classification Search .......... 362/616, 362/615, 623, 624, 627, 628, 551, 555, 561; 349/62, 58, 61, 67, 74, 77
See application file for complete search history.

(56) References Cited

U.S. PATENT DOCUMENTS

| | | | | |
|---|---|---|---|---|
| 2,634,530 A | * | 4/1953 | Gates, Jr. et al. | ............. 40/546 |
| 5,433,024 A | * | 7/1995 | Lerner | .................. 40/546 |
| 5,640,483 A | * | 6/1997 | Lin | .................... 385/146 |
| 5,856,819 A | * | 1/1999 | Vossler | ............... 345/102 |
| 6,270,243 B1 | * | 8/2001 | Simon | ................ 362/560 |
| 6,471,388 B1 | * | 10/2002 | Marsh | ................ 362/559 |
| 6,741,301 B2 | | 5/2004 | Tsuji | |
| 6,853,418 B2 | * | 2/2005 | Suzuki et al. | ......... 349/113 |
| 6,871,975 B2 | * | 3/2005 | Chuang | ............... 362/27 |
| 6,882,380 B2 | * | 4/2005 | Yu et al. | ............... 349/61 |
| 7,001,059 B2 | * | 2/2006 | Han et al. | ............ 362/616 |
| 7,033,034 B2 | * | 4/2006 | Oh | ..................... 362/616 |
| 7,036,971 B2 | * | 5/2006 | Kuo | ................... 362/616 |
| 7,161,644 B2 | * | 1/2007 | Kim et al. | ............. 349/62 |
| 2004/0223343 A1 | | 11/2004 | Chu et al. | |
| 2005/0052342 A1 | * | 3/2005 | Wu et al. | ................. 345/4 |

* cited by examiner

FOREIGN PATENT DOCUMENTS

JP       2002244133 A      8/2002

*Primary Examiner*—Sandra L. O'Shea
*Assistant Examiner*—Gunyoung T. Lee
(74) *Attorney, Agent, or Firm*—MacPherson Kwok Chen & Heid LLP

(57) ABSTRACT

A backlight assembly that allows a more efficient light usage and thinner device size is presented. The backlight assembly includes a first light guide and a second light guide that each has a light incident face, a light exiting face, and a light interfacing face. The light interfacing face of the first light guide has a first interfacing portion and a second interfacing portion while the light interfacing face of the second light guide has a third interfacing portion and a fourth interfacing portion. A light reflective member has a first reflection face arranged at the second light reflection face portion and a second reflection face arranged at the fourth light reflective face portion, and the light source supplies light to the first and second light incident faces. The light incident faces are on the same side of the light guiding members.

17 Claims, 9 Drawing Sheets

BACKLIGHT ASSEMBLY AND LIQUID CRYSTAL DISPLAY DEVICE USING THE SAME

RELATED APPLICATIONS

This application is a Continuation of U.S. patent application Ser. No. 10/452,319 filed on May 30, 2003 now U.S. Pat. No. 7,161,644, which claims priority under 35 USC §119 to Korean Patent Application Serial No. 2002-58319 filed on Sep. 26, 2002.

BACKGROUND OF THE INVENTION

1. Field of the Invention

The disclosure relates to a backlight assembly and a liquid crystal display device using the same. More particularly, the disclosure relates to a backlight assembly and liquid crystal display device using the same in which light generated from a single light source is respectively supplied to two light guiding plates to display two different images, to minimize light loss and to decrease the thickness of elements of the backlight assembly while minimizing the light loss.

2. Description of the Related Art

Generally, liquid crystal is a material in an intermediate state between solid and liquid. As for its electrical property, liquid crystal may change its aligned angle according to an applied electric field. As for its optical property, liquid crystal may change transmissivity thereof according to its aligned angle. The liquid crystal display (LCD) device displays images using these properties of liquid crystal.

A generalized liquid crystal display device has an LCD panel assembly for controlling the liquid crystal and a backlight assembly for supplying light to the LCD panel assembly.

The LCD panel assembly includes an LCD panel and a driving module. The LCD panel precisely controls the aligned angle of the liquid crystal in an area ranging from a few $\mu m^2$ to a few hundred $\mu m^2$, and the driving module generates driving signals for driving the LCD panel.

The backlight assembly includes a light source, a light guiding plate, and optical sheets.

As the light source, either cold cathode fluorescent lamp (CCFL) or light emitting diode (LED) is frequently used because of its long life span, easy manufacturability, and low heat generation. The CCFL is mainly used in large-screen LCD devices, whereas LED is mainly used in small-screen LCD devices.

The light guiding plate changes the optical distribution of the light generated from the light source and supplies the redistributed light to the LCD panel. Specifically, the light guiding plate changes a line source of light or a point source of light into a surface source of light.

The optical sheets are installed between the LCD panel assembly and the light guiding plate. The optical sheets make uniform the brightness of the light emitted from the light guiding plate and also control the viewing angle.

In the conventional LCD device having the above construction, images are displayed while light passes through the light guiding plate, optical sheets and the LCD panel assembly sequentially. As a consequence, image can be displayed only in one direction.

Recently, an improved LCD device called "dual liquid crystal display device" is disclosed, and the dual liquid crystal display device can overcome the one directional displaying limitation of the conventional LCD device and can display information in two different directions.

In a conventional dual LCD device, two LCD panels, each performing image display independently, are arranged in an overlapping configuration to display images in two different directions. Specifically, the conventional dual LCD device includes a first LCD device and a second LCD device. The first LCD device includes a first LCD panel, a first light source, a first light guiding plate, first optical sheets, a first light reflective plate and a first receiving container. The second LCD device includes a second LCD panel, a second light source, a second light guiding plate, second optical sheets, a second light reflective plate and a second receiving container.

The first LCD device displays images in a first direction, and the second LCD device display images in a second direction.

The conventional dual LCD device enables displaying images in two different directions, but does so at the expense of other desirable qualities. For example, the extra parts necessary to achieve this dual-display quality increase volume and thickness of the LCD device, making the LCD device bulkier and less desirable.

SUMMARY OF THE INVENTION

Accordingly, the present invention is provided to substantially obviate one or more problems due to limitations and disadvantages of the related art.

In one aspect, the present invention is a backlight assembly that includes a first light guiding member, a second light guiding member that overlaps the first light guiding member, a light reflective member, and a light source. The first light guiding member includes i) a first light incident face, ii) a first light exiting face, and iii) a first interfacing a face that has a first interfacing portion and a second interfacing portion connected to the first interfacing portion. The second light guiding member includes i) a second light incident face, ii) a second light exiting face, and iii) a second interfacing face that has a third interfacing portion and a fourth interfacing portion connected with the third interfacing portion. The first light guiding member and the second light guiding member each has a stepped portion. The light reflective member has a first reflection face arranged at the second interfacing portion and a second reflection face arranged at the fourth interfacing portion. The light source supplies light to the first and second light incident faces, which are disposed on the same side of the first and second light guiding members, respectively.

BRIEF DESCRIPTION OF THE DRAWINGS

The above features and other advantages of the present invention will become more apparent by describing in detail the preferred embodiments thereof with reference to the accompanying drawings, in which.

DETAILED DESCRIPTION OF THE EMBODIMENTS

Hereinafter, reference will now be made in detail to the preferred embodiments of the present invention, examples of which are illustrated in the accompanying drawings.

Embodiment 1

Figure 1:
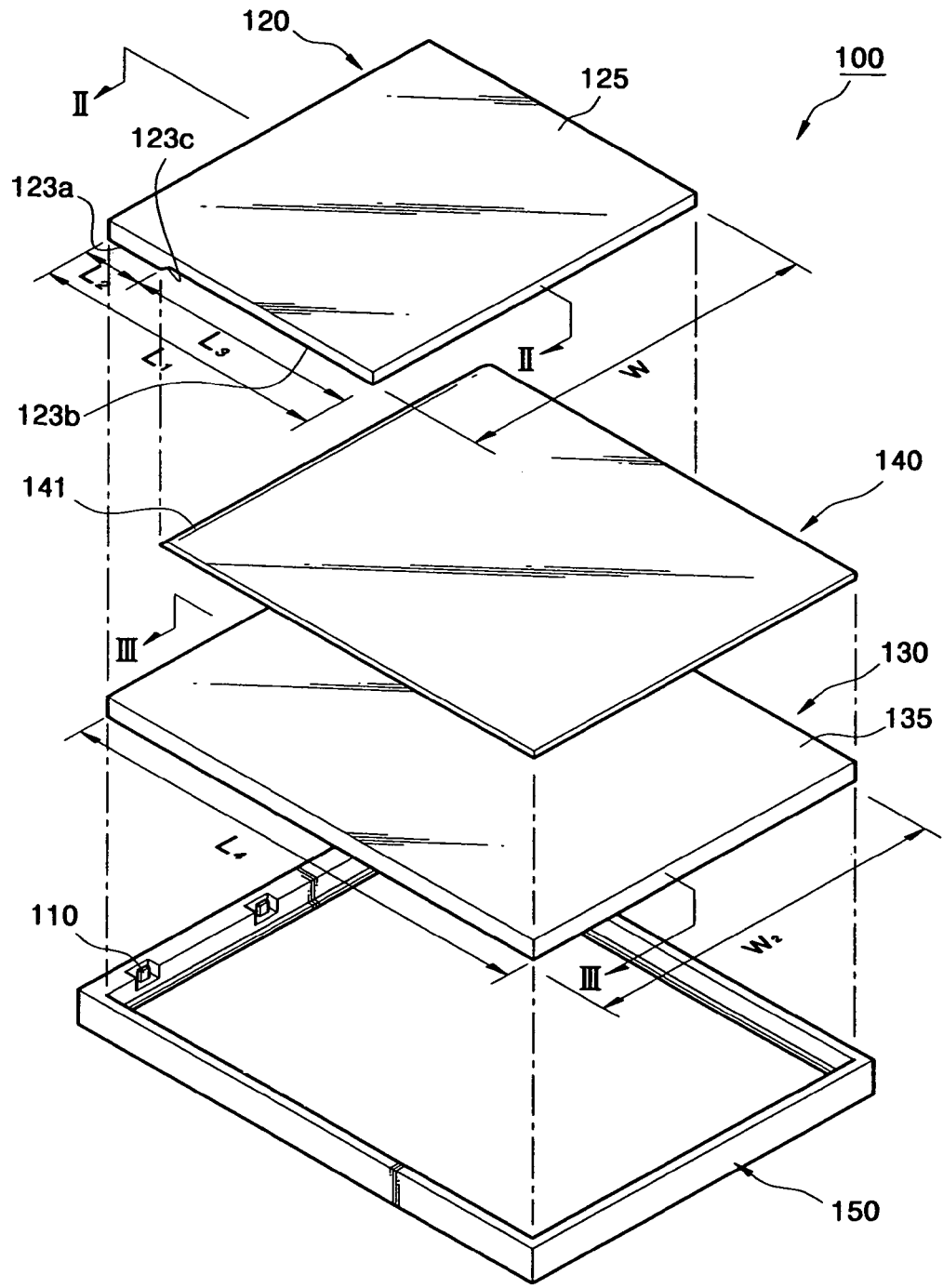
FIG. 1 is a perspective view of a backlight assembly according to a first exemplary embodiment of the present invention.

FIG. 1 is a perspective view of a backlight assembly according to a first exemplary embodiment of the present invention.

Referring to FIG. 1, a backlight assembly 100 includes a light source 110, a first light guiding plate 120, a second light guiding plate 130 and a light reflective plate 140.

Alternatively, the backlight assembly 100 can further include a receiving container 150 in which the first light guiding plate 120, the second light guiding plate 130, the light reflective plate 140 and the light source are received.

The light source 110 generates a first light radially. In FIG. 1, the light source 110 may be a point light source such as a light emitting diode. Alternatively, the light source 110 may be a line light source such as a cold cathode fluorescent lamp (CCFL).

Figure 2:
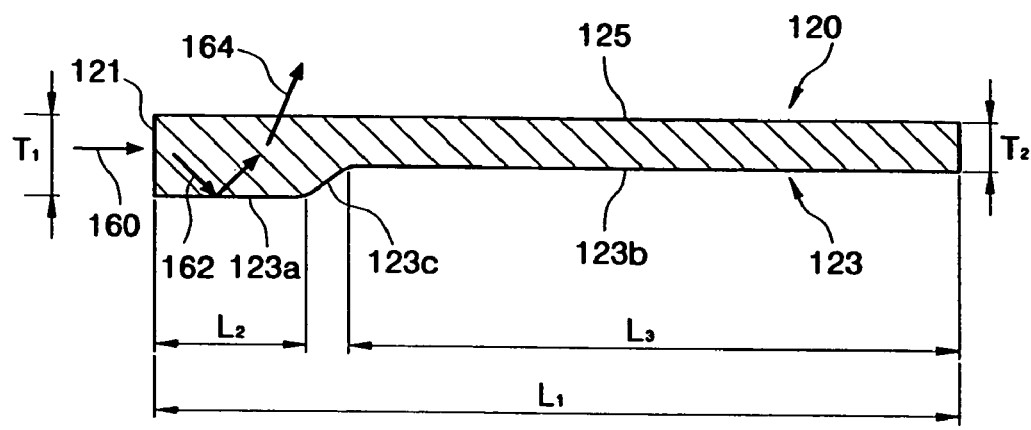
FIG. 2 is a sectional view taken along the line II-II of FIG. 1.

FIG. 2 is a sectional view taken along the line II-II of FIG. 1.

Referring to FIG. 2, the first light guiding plate 120 has a three-dimensional shape such as a rectangular parallelepiped plate. Specifically, the first light guiding plate 120 has at least three side faces, a top face and a bottom face, wherein the top and the bottom faces are connected with the side faces. For example, the first light guiding plate 120 has four side faces.

Here, the light source 110 supplies a first light 160 into at least one of the four side faces. Hereinafter, the side face onto which the first light 160 from the light source 110 is supplied is referred to as a first light incident face 121.

The first light 160 generated from the light source 110 is refracted to change the advancing direction thereof while the first light 160 passes through the first light incident face 121. This is because the first light guiding plate 120 has a different refractive index than air. Hereinafter, the light that has passed through the first light incident face 121 is referred to as a second light 162.

A first interfacing face 123 reflects the second light 162 toward a first light exiting face to be described later.

The first interfacing face 123 is comprised of a first interfacing portion 123a and a second interfacing portion 123b. The first interfacing face 123 has a first width (W1) and a first length (L1).

The first interfacing portion 123a has the first width (W1) and a second length (L2) that is less than the first length (L1) when measured from the first light incident face 121 toward an opposite direction of the first light incident face 121.

The second interfacing portion 123b is connected with the first interfacing portion 123a, and has a third length (L3) that is somewhat shorter than a length remaining after the second length (L2) is subtracted from the first length (L1). The second interfacing portion 123b lies in a plane that is different from and substantially parallel to the plane of the first interfacing portion 123a.

The first interfacing portion 123a is connected with the second interfacing portion 123b by an inclined face 123c. The inclined face 123c, i.e., the connecting portion (or stepped portion) has a length that corresponds to a value remaining after the second length (L2) and the third length (L3) are subtracted from the first length (L1).

The portion of the inclined face 123c that meets the first interfacing portion 123a and the portion of the inclined face 123c that meets the second interfacing portion 123b may have smooth curve shapes. This is because the inclined face 123c causes occurrence of discontinuous bright line in the first light guiding plate 120.

The first light exiting face 125 allows the second light 162 reflected by the first interfacing portion 123a and the second interfacing portion 123b of the first interfacing face 123 to be output therethrough. The light output from the first light exiting face 125 proceeds with a different angle from the proceeding direction of the second light 162, and accordingly it is referred to as a third light 164.

The first light exiting face 125 is in parallel with the first interfacing portion 123a and the second interfacing portion 123b. The portion between the first light exiting face 125 and the first interfacing portion 123a has a first thickness (T1), and the portion between the first light exiting face 125 and the second interfacing portion 123b has a second thickness (T2) that is thinner than the first thickness (T1).

Figure 3:
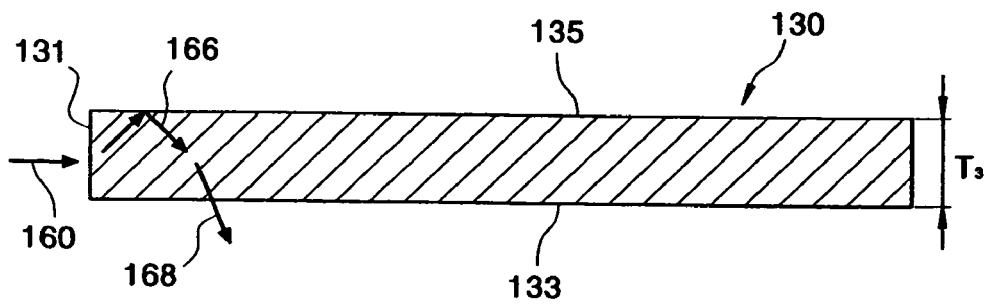
FIG. 3 is a sectional view taken along the line III-III of FIG. 1.

FIG. 3 is a sectional view taken along the line III-III of FIG. 1.

Referring to FIG. 3 and FIG. 1, the second light guiding plate 130 overlies the first light guiding plate 120. The second light guiding plate 130 is similar in shape to the first light guiding plate 120, and has a second width (W2) and a fourth length (L4). The second width (W2) is wider than the first width (W1), and the fourth length (L4) is longer than the first length (L1).

The second light guiding plate 130 is comprised of a second light incident face 131, a second interfacing face 135 and a second light exiting face 133.

The second light incident face 131 is arranged such that it does not disaccord with the first light incident face 121 of the first light guiding plate 120. In other words, the second light incident face 131 is aligned with the first light incident face 121 of the first light guiding plate 120 to receive the first light 160. The first light 160 generated from the light source 110 is partially incident onto the second light incident face 131. Hereinafter, the first light 160 that is incident onto the second light incident face 131 is referred to as a fourth light 166.

The second interfacing face 135 connected to the second light incident face 131 faces the first interfacing portion 123a and the second interfacing portion 123b of the first light guiding plate 120. The second interfacing face 135 reflects the fourth light 166 to direct the reflected fourth light 166 toward the second light exiting face 133.

Figure 4:
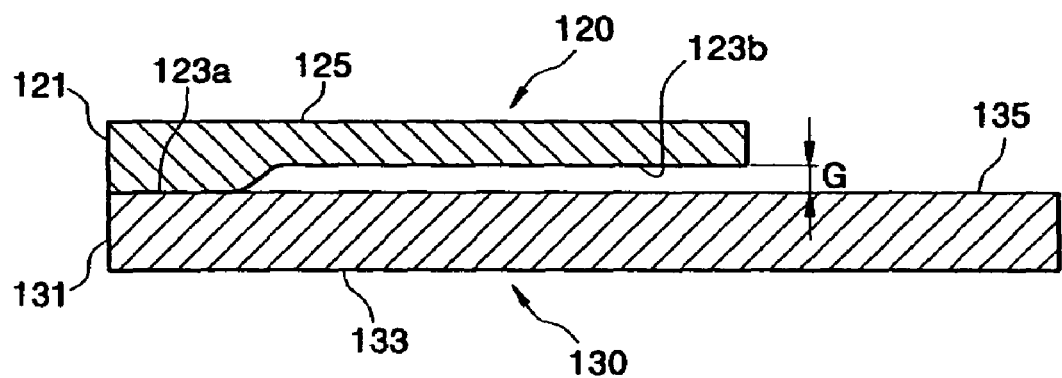
FIG. 4 is a sectional view showing a coupling structure of a first light guiding plate and a second light guiding plate according to a first exemplary embodiment of the present invention.

FIG. 4 is a sectional view showing a coupling structure of a first light guiding plate and a second light guiding plate according to a first exemplary embodiment of the present invention.

Referring to FIG. 4, the second interfacing face 135 is directly in contact with the first interfacing portion 123a. Between the second interfacing 135 and the second interfacing portion 123b, there is a gap (G). In other words, a part of the second interfacing 135 is spaced apart from the second interfacing portion 123b by the gap (G).

Referring again to FIG. 3, the fourth light 166 reflected by the second interfacing 135 is directed toward the second light exiting face 133. Hereinafter, the light output from the second light exiting face 133 is referred to as a fifth light 168. The second light exiting face 133 faces the second interfacing 135. The second light exiting face 133 and the second interfacing 135 have a uniform third thickness of T3 throughout an entire area of the second light guiding plate 130. The third thickness (T3) of the second light guiding plate 130 is thinner than the first thickness (T1) of the first light guiding plate 120.

Figure 5:
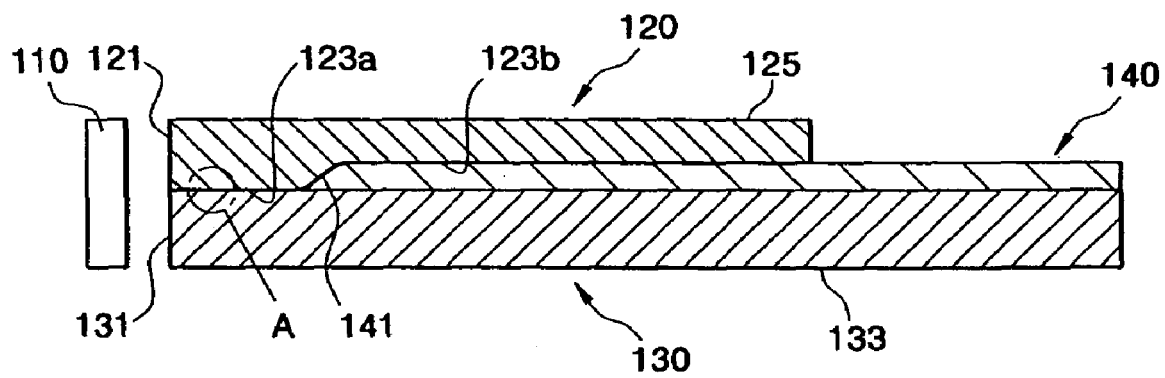
FIG. 5 is a sectional view showing a first light guiding plate, a second light guiding plate and a light reflective plate according to a first exemplary embodiment of the present invention.

FIG. 5 is a sectional view showing a first light guiding plate, a second light guiding plate and a light reflective plate according to a first exemplary embodiment of the present invention.

Referring to FIG. 1 and FIG. 5, the light reflective plate 140 is interposed between the first light guiding plate 120 and the second light guiding plate 130. The light reflective plate 140 has a thickness that is equal to the gap between the second interfacing portion 123b and the second interfacing face 135.

Also, among the edges of the light reflective plate 140, the edge facing the inclined face 123c of the first light guiding plate 120 has an inclined face 141 that is designed to fit with the inclined face 123c so as to be closely in contact with the inclined face 123c.

The first light guiding plate 120 and the second light guiding plate 130 are attached to each other by means of an attaching member, which is to prevent the first light guiding plate 120 from getting displaced with respect to the second light guiding plate 130.

Figure 6:
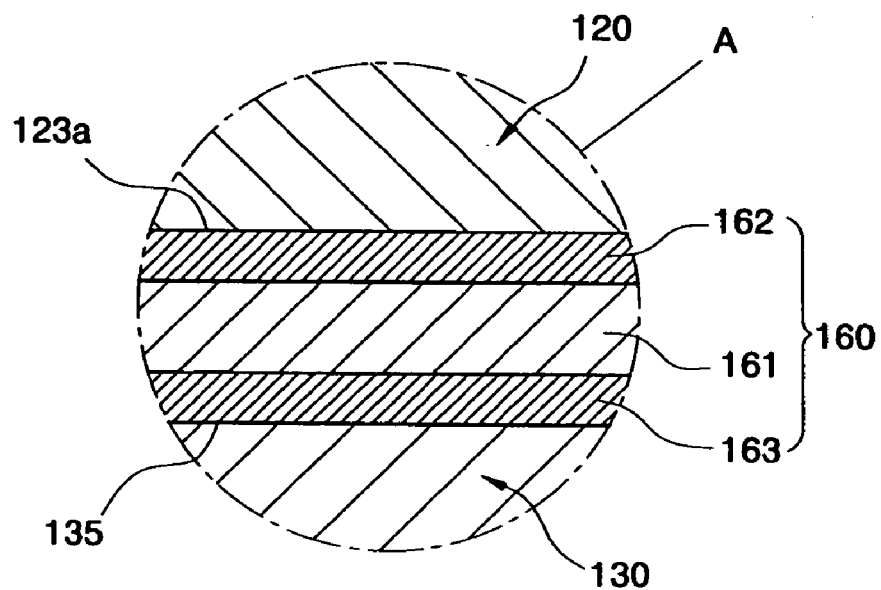
FIG. 6 is an enlarged view of the portion "A" in FIG. 5 according to a first exemplary embodiment of the present invention.

FIG. 6 is an enlarged view of the portion "A" in FIG. 5 according to a first exemplary embodiment of the present invention.

Referring to FIG. 6, a double-layered adhesive tape 160 is interposed between the first interfacing portion 123a of the first light guiding plate 120 and the second interfacing face 135 of the second light guiding plate 130 facing the first interfacing portion 123a. The double-layered adhesive tape 160 includes a transparent base film 161, and adhesive layers 162 and 163 coated on both surfaces of the base film 161.

Figure 7:
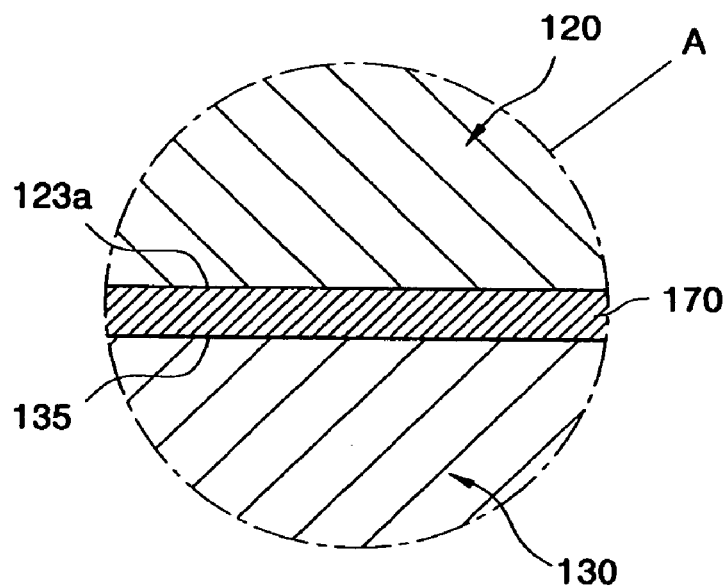
FIG. 7 is an enlarged view of the portion "A" in FIG. 5 and shows a modification in the attachment of the first light guiding plate and the second light guiding plate according to a first exemplary embodiment of the present invention.

FIG. 7 is an enlarged view of the portion "A" in FIG. 5 and shows a modification in the attachment of the first light guiding plate and the second light guiding plate according to a first exemplary embodiment of the present invention.

Referring to FIG. 7, a thin adhesive layer 170 is interposed between the first interfacing portion 123a of the first light guiding plate 120 and the second interfacing face 135 of the second light guiding plate 130 facing the first interfacing portion 123a. The thin adhesive layer 170 allows the first light guiding plate 120 and the second light guiding plate 130 to adhere to each other.

Figure 8:
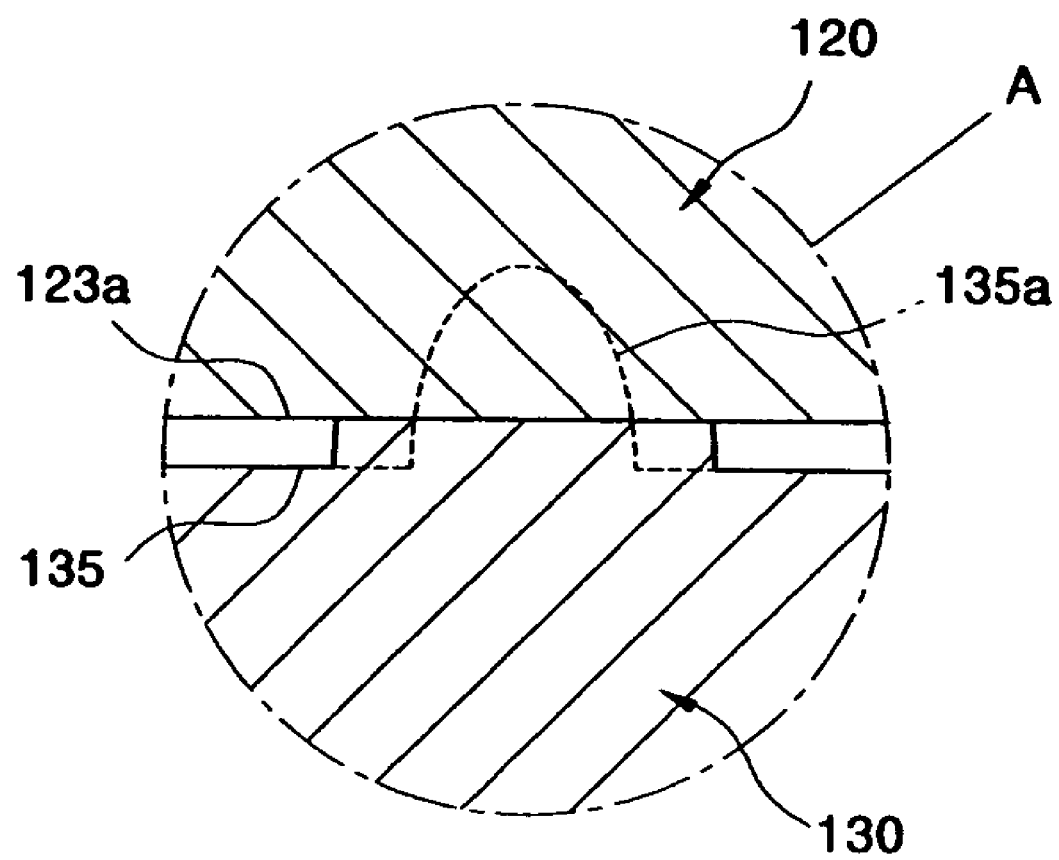
FIG. 8 is an enlarged view of the portion "A" in FIG. 5 and shows another modification in the attachment of the first light guiding plate and the second light guiding plate according to a first exemplary embodiment of the present invention.

FIG. 8 is an enlarged view of the portion "A" in FIG. 5 and shows another modification in the attachment of the first light guiding plate and the second light guiding plate according to a first exemplary embodiment of the present invention.

Referring to FIG. 8, at least one adhering protrusion 135a is formed on the second interfacing face 135 of the second light guiding plate 120. In a state that the first interfacing portion 123a of the first light guiding plate 120 is in contact with the adhering protrusion 135a formed on the second interfacing face 135 of the second light guiding plate 130, ultrasonic waves or heat is applied to the adhering protrusion 135a. As a result, the adhering protrusion 135a is melted and the melted adhering protrusion 135a allows the first interfacing portion 123a and the second interfacing face 135 to adhere to each other. The adhering protrusion 135a is preferably processed to form a minimum gap between the first interfacing portion 123a and the second interfacing face 135.

Figure 9:
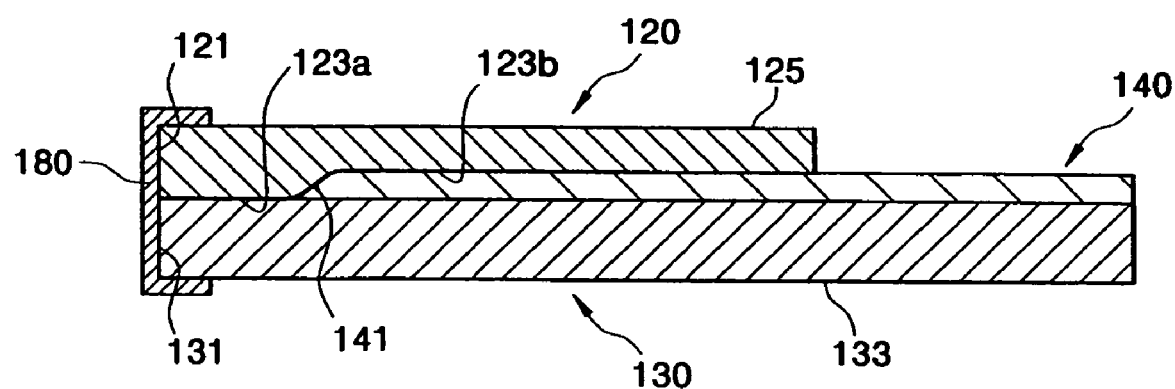
FIG. 9 is a sectional view showing yet another modification in the attachment of the first light guiding plate and the second light guiding plate according to a first exemplary embodiment of the present invention.

FIG. 9 is a sectional view showing yet another modification in the attachment of the first light guiding plate and the second light guiding plate according to a first exemplary embodiment of the present invention.

Referring to FIG. 9, in a state that the first light guiding plate 120 and the second light guiding plate 130 overlap with each other, some portions of the first light guiding plate 120 may be fixed to the second light guiding plate 130 by means of a transparent clip 180 or the like. Specifically, a portion of the clip 180 presses the first light exiting face 125 of the first light guiding plate 120 against the second light guiding plate 130 and the remainder of the clip 180 presses the second light exiting face 133 of the second light guiding plate 130 against the first light guiding plate 120.

The first light guiding plate 120, the light reflective plate 140, the second light guiding plate 130 and the light source 110 having the aforementioned coupling structure are received in the receiving container 150 shown in FIG. 1 during the assemblage of the backlight assembly 100.

The receiving container 150 encloses the sidewalls of the first light guiding plate 120 and the sidewalls of the second light guiding plate 130, and has an opening or an opened bottom face such that the first light exiting face 125 of the first light guiding plate 120 and the second light exiting face 133 of the second light guiding plate 130 are exposed.

Also, the light source 110 is installed within the receiving container 150 such that the light source 110 faces the first light incident face 121 and the second light incident face 131.

Embodiment 2

Figure 10:
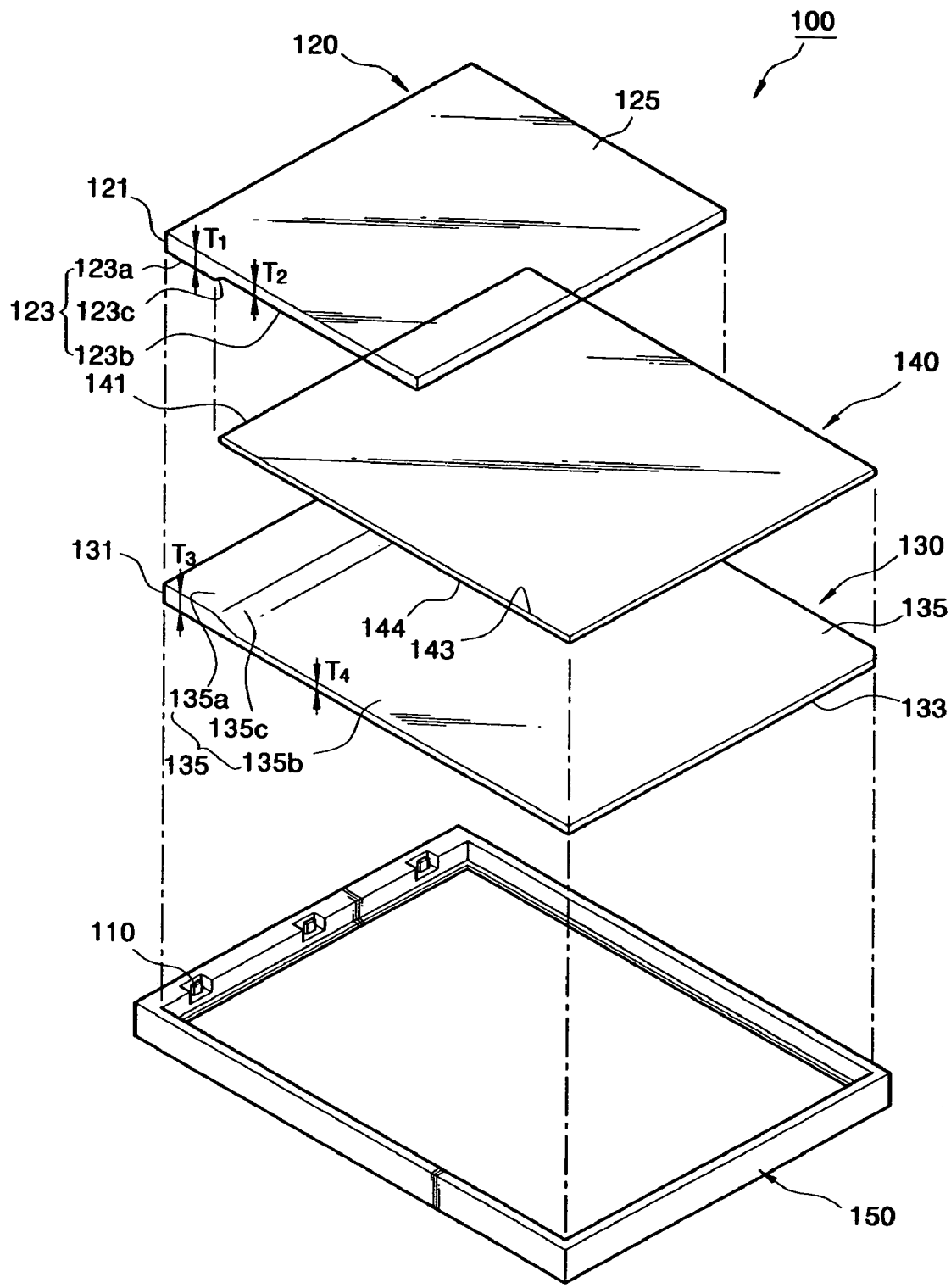
FIG. 10 is a sectional view showing a backlight assembly according to a second exemplary embodiment of the present invention.

FIG. 10 is a sectional view showing a backlight assembly according to a second exemplary embodiment of the present invention.

Referring to FIG. 10, a backlight assembly 100 includes a light reflective plate 140, a first light guiding plate 120, a second light guiding plate 130, a light source 110 and a receiving container 150.

The light reflective plate 140 has two interfacing faces 143 and 144. One of the two interfacing faces is the first interfacing face 143 and the other is the second interfacing face 144.

The first light guiding plate 120 is arranged to face the first interfacing face 143, and the second light guiding plate 130 is arranged to face the second interfacing face 144.

The first light guiding plate 120 is comprised of a first light incident face 121, a first interfacing face 123 having a first interfacing portion 123a and a second interfacing portion 123b, and a first light exiting face 125 facing the first interfacing face 123. Reference numeral 123c represents a transitional region between the first interfacing portion 123a and the second interfacing portion 123b. The transitional region 123c may have a smooth curve structure or an inclined surface structure.

A first thickness of T1 between the first interfacing portion 123a and the first light exiting face 125 is different from a second thickness of T2 between the second interfacing portion 123b and the first light exiting face 125. Preferably, the first thickness of T1 is greater than the second thickness of T2.

The first interfacing face 143 of the light reflective plate 140 is laid over the first light guiding plate 120 and aligned with the second interfacing portion 123b of the first light guiding plate 120, so that the overall thickness of the backlight assembly can be decreased.

The second light guiding plate 130 is comprised of a second light incident face 131, a second interfacing face 135 having a third interfacing portion 135a and a fourth interfacing portion 135b, and a second light exiting face 133 facing the second interfacing face 135. Reference numeral 135c represents a transitional region between the third interfacing portion 135a and the fourth interfacing portion 135b. The transitional region 135c may have a smooth curve structure or an inclined surface structure.

A third thickness of T3 between the third interfacing portion 135a and the second light exiting face 133 is different from a fourth thickness of T4 between the fourth interfacing portion 135b and the second light exiting face 133. Preferably, the third thickness of T3 is thicker than the fourth thickness of T4.

The second interfacing face 144 of the light reflective plate 140 is positioned to lie over the second light guiding plate 130 and align with the fourth interfacing portion 135b, so that an overall thickness of the backlight assembly can be decreased.

By the above arrangement, the light reflective plate 130 is interposed between the first light guiding plate 120 and the second light guiding plate 130.

The first light guiding plate 120, the light reflective plate 140, the second light guiding plate 130 and the light source 110 having the aforementioned coupling structure are installed in the receiving container 150 shown in FIG. 10 during the assemblage of the backlight assembly 100.

The receiving container 150 encloses the sidewalls of the first light guiding plate 120 and the sidewalls of the second light guiding plate 130, and has an opening or an opened bottom face such that the first light exiting face 125 of the first light guiding plate 120 and the second light exiting face 133 of the second light guiding plate 130 are exposed.

Also, the light source 110 is installed within the receiving container 150 such that the light source 110 faces the first light incident face 121 and the second light incident face 131.

Embodiment 3

Figure 11:
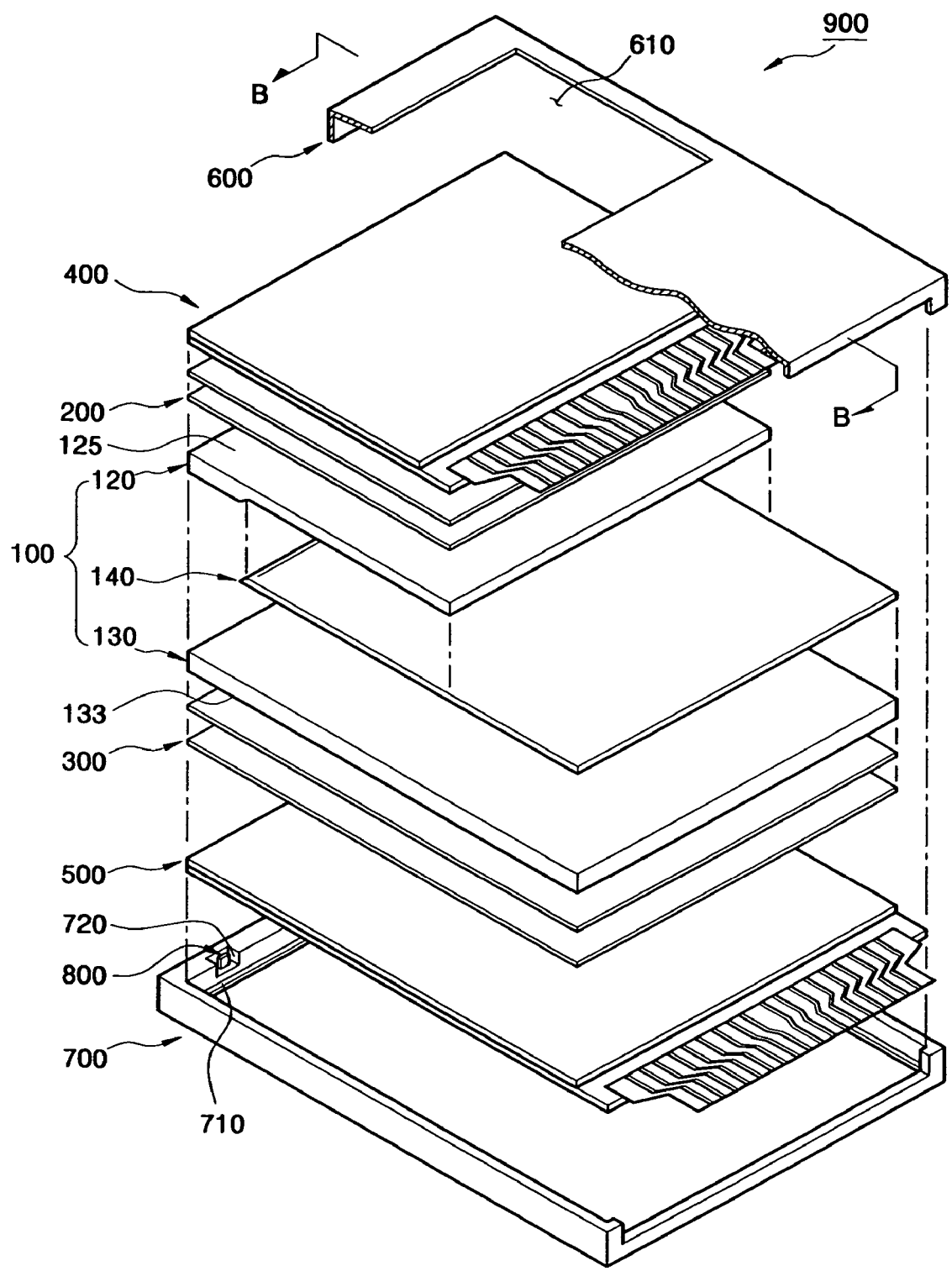
FIG. 11 is an exploded perspective view of a liquid crystal display device according to an exemplary embodiment of the present invention.
Figure 12:
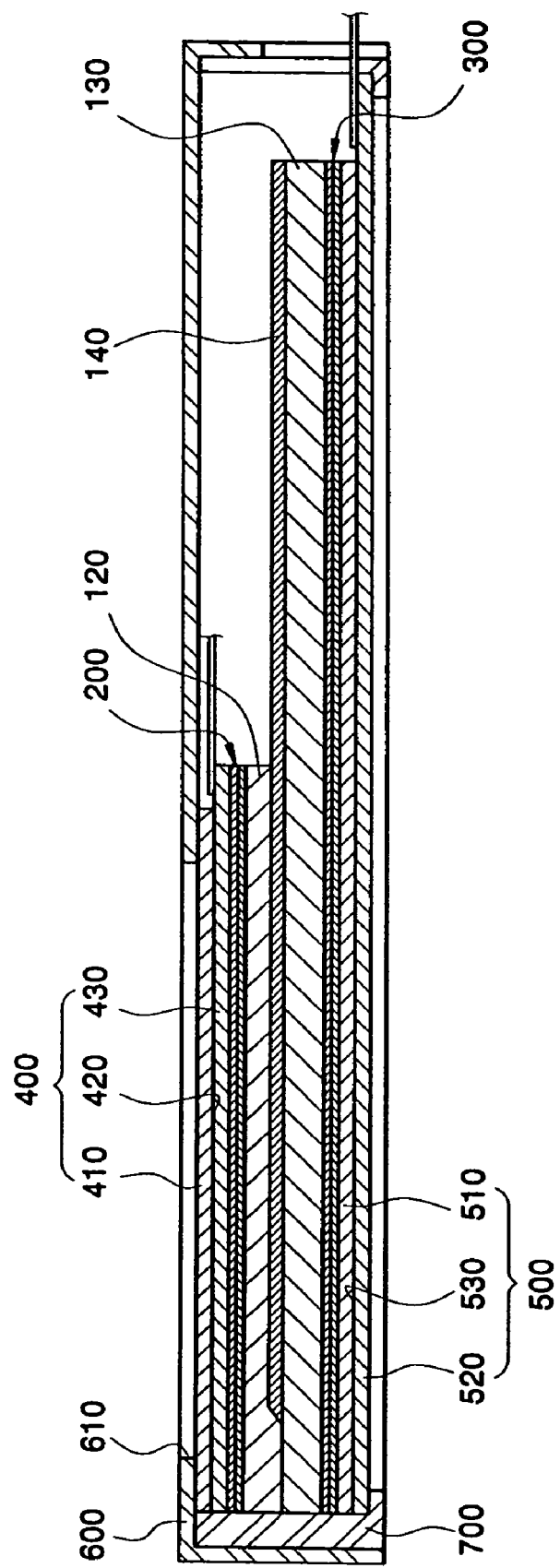
FIG. 12 is a sectional view taken along the line B-B of FIG. 11 after the liquid crystal display device is assembled.

FIG. 11 is an exploded perspective view of a liquid crystal display device according to an exemplary embodiment of the present invention and FIG. 12 is a sectional view taken along the line B-B of FIG. 11 after the liquid crystal display device is assembled.

Referring to FIG. 11 or FIG. 12, a liquid crystal display device 900 includes a light source 800, a backlight assembly 100, optical sheets (200, 300), a first display panel 400, a second display panel 500 and receiving containers (600, 700).

The light source 800 generates light radially. The light source 800 may be a line light source such as a cold cathode fluorescent lamp (CCFL) or a point light source such as a light emitting diode.

The backlight assembly 100 includes a first light guiding plate 120, a second light guiding plate 130, and a light reflective plate 140.

Since the backlight assembly 100 has the same construction as those of the first and second exemplary embodiment, repeated description thereof will be omitted. Hereinafter, like reference numerals identify identical elements of the backlight assembly 100 throughout the drawings.

The first display module 400 is installed to face a first light exiting face 125 of the first light guiding plate 120. The first display module 400 has a plain surface area that is substantially equal to the surface area of the first light exiting face 125.

Any construction for the first display module 400 may be allowed as long as the first display module 400 can display images by using the liquid crystal and the light passing through liquid crystal molecules.

Preferably, the first display module 400 includes a first color filter substrate 410, a first TFT substrate 430, and a first liquid crystal 420 interposed between the first color filter substrate 410 and the first TFT substrate 430.

The second display module 500 includes a second color filter substrate 520, a second TFT substrate 510, and a second liquid crystal 530 interposed between the second color filter substrate 520 and the second TFT substrate 510. The second display module 500 is installed to face a second light exiting face 133 of the second light guiding plate 130. The second display module 500 has a surface area that is substantially equal to the area of the second light exiting face 133. Since the area of the second light exiting face 133 is larger than that of the first light exiting face 125, the area of the second display module 500 is larger than that of the first display module 400.

The optical sheets are comprised of the first optical sheets 200 and the second optical sheets 300.

The first optical sheets 200 are installed between the first display module 400 and the first light guiding plate 120, and the second optical sheets 300 are installed between the second display module 500 and the second light guiding plate 130.

In order to enhance light efficiency in the LCD device, each of the first and second optical sheets (200, 300) includes at least one sheet. Preferably, each of the first and second optical sheets (200, 300) includes a diffusion sheet and a prism sheet. A brightness enhanced film may be further added to the diffusion sheet and the prism sheet.

The first display module 400, the optical sheets (200, 300), the backlight assembly 100, and the second display module 500 are received in the receiving containers (600, 700).

The receiving containers (600, 700) are comprised of a top chassis 600 and a bottom mold frame 700. "Top" and "bottom," as used herein, refers to the top and the bottom in reference to the orientation of the figure in FIG. 11.

The bottom mold frame 700 has a square frame structure that is sized to receive four sidewalls of the second light guiding plate 130.

The bottom mold frame 700 is comprised of sidewalls only, and allows the second display module 500, the optical sheets (200, 300), the backlight assembly 100 and the first display module 400 to be received therein. The bottom mold frame 700 has a fixing rib 710 which the second display module 500 is hung on and fixed to. Also, in the bottom mold frame 700, the sidewall adjacent to the first light incident face 121 of the first light guiding plate 120 and the second light incident face 131 of the second light guiding plate 130 has a light source receiving groove 720 into which the light source 800 is placed.

The top chassis 600 is coupled with the bottom mold frame 700 to keep the first display module 400 inside the bottom mold frame 700.

The top chassis 600 has an opening 610 such that users can view images displayed through the first display module 400.

Hereinafter, an assembling method of the LCD device is described.

First, the first display module 500 for displaying images is placed in the bottom mold frame 700 such that a first face of the first display module 500 faces the inner bottom face of the bottom mold frame 700, and the first face of the first display module 500 is fixed to the bottom mold frame 700 by using the fixing rib 710. Then, the second optical sheets 300 are mounted on a second face of the first display module which is the face opposite the first face.

After the second optical sheets 300 are placed in the bottom mold frame 700, an assembly including the first light guiding plate 120, the light reflective plate 140 and the second light guiding plate 130 coupled with each other is mounted on the upper face of the second optical sheets 300. The second light exiting face 133 of the second light guiding plate 130 is coupled to the bottom mold frame 700 such that the second light exiting face 133 faces the second optical sheets 300.

The first optical sheets 200 are closely mounted on the first light guiding plate 120, and then the first display module 400 is mounted on the first optical sheets 200.

After the second display module 500 and the first display module 400 are sequentially placed in the bottom mold frame 700, the top chassis 600 is coupled with the first display module 400. The top chassis 600 is coupled with the bottom mold frame 700 while the top chassis 600 presses edges of the first display module 400.

While the present invention and its advantages have been described in detail, it should be understood that various changes, substitutions and alterations can be made herein without departing from the spirit and scope of the invention as defined by appended claims.

What is claimed is:

1. A backlight assembly comprising:
a first light guiding member comprising i) a first light incident face, ii) a first light exiting face, and iii) a first interfacing face including a first interfacing portion and a second interfacing portion connected to the first interfacing portion, the first light guiding member having a stepped portion between the first interfacing portion and the second interfacing portion;
a second light guiding member overlapping the first light guiding member and comprising i) a second light incident face, ii) a second light exiting face, and iii) a second interfacing face including a third interfacing portion and a fourth interfacing portion connected with the third interfacing portion, the second light guiding member having a stepped portion between the third interfacing portion and the fourth interfacing portion;
a light reflective member having a first reflection face arranged at the second interfacing portion and a second reflection face arranged at the fourth interfacing portion; and
a light source for supplying a light to the first and second light incident faces,
wherein the first and second light incident faces are disposed at a same side of the first and second light guiding members, respectively.

2. The backlight assembly of claim 1, wherein the light source is adjacent to the first and second light incident faces.

3. The backlight assembly of claim 1, wherein the first and second interfacing portions are substantially parallel to the first light exiting face.

4. The backlight assembly of claim 3, wherein the third and fourth interfacing portions are substantially parallel to the second light exiting face.

5. The backlight assembly of claim 1, wherein the first reflection face faces the second interfacing portion, and the second reflection face faces the fourth interfacing portion.

6. The backlight assembly of claim 1, wherein the first light guiding member further comprises a first portion between the first light exiting face and the first interfacing portion having a first thickness, and a second portion between the first light exiting face and the second interfacing portion having a second thickness thinner than the first thickness,
and the second light guiding member further comprises a third portion between the second light exiting face and the third interfacing portion having a third thickness, and a fourth portion between the second light exiting face and the fourth interfacing portion having a fourth thickness thinner than the third thickness.

7. The backlight assembly of claim 6, wherein the first interfacing portion of the first light guiding member faces the third interfacing portion of the second light guiding member, and the second interfacing portion of the first light guiding member faces the fourth interfacing portion of the second light guiding member.

8. The backlight assembly of claim 1, wherein the light reflective member does not extend to a region between the first interfacing portion and the third interfacing portion.

9. A liquid crystal display (LCD) device comprising:
a first light guiding member comprising i) a first light incident face, ii) a first light exiting face, and iii) a first interfacing face including a first interfacing portion and a second interfacing portion connected to the first interfacing portion;
a second light guiding member overlapped with the first light guiding member and comprising i) a second light incident face, ii) a second light exiting face, and iii) a second interfacing face including a third interfacing portion and a fourth interfacing portion connected with the third interfacing portion, wherein the first interfacing portion contacts the third interfacing portion to form a nonreflective region;
a light reflective member having a first reflection face arranged at the second interfacing portion and a second reflection face arranged at the fourth interfacing portion, the light reflective member being spaced apart from the first and second light incident faces of the first and second light guiding members by a length of the nonreflective region; and
a light source for supplying a light to the first and second light incident faces.

10. The LCD device of claim 9, the first and second light guiding members have a stepped portion.

11. The LCD device of claim 9, wherein the light source is adjacent to the first and second light incident faces.

12. The LCD device of claim 9, wherein the first and second interfacing portions are substantially parallel to the first light exiting face.

13. The LCD device of claim 12, wherein the third and fourth interfacing portions are substantially parallel to the second light exiting face.

14. The LCD device of claim 9, wherein the first reflection face faces the second interfacing portion, and the second reflection face faces the fourth interfacing portion.

15. The LCD device of claim 9, wherein the first light guiding member further comprises a first portion between the first light exiting face and the first interfacing portion having a first thickness, and a second portion between the first light exiting face and the second interfacing portion having a second thickness thinner than the first thickness, and the second light guiding member further comprises a third portion between the second light exiting face and the third interfacing portion having a third thickness, and a fourth portion between the second light exiting face and the fourth interfacing portion having a fourth thickness thinner than the third thickness.

16. The LCD device of claim 15, wherein the first interfacing portion of the first light guiding member faces the third interfacing portion of the second light guiding member, and the second interfacing portion of the first light guiding member faces the fourth interfacing portion of the second light guiding member.

17. The LCD device of claim 9, wherein the light reflective member does not extend to a region between the first interfacing portion and the third interfacing portion.

* * * * *